US009705709B2

(12) United States Patent
Kraemer et al.

(10) Patent No.: US 9,705,709 B2
(45) Date of Patent: Jul. 11, 2017

(54) RECIPIENT-DRIVEN TRAFFIC OPTIMIZING OVERLAY SYSTEMS AND METHODS

(71) Applicant: Exara, Inc., San Juan Capistrano, CA (US)

(72) Inventors: Eric Justin Kraemer, Aliso Viejo, CA (US); Eric Tristan Lemoine, San Marcos, CA (US)

(73) Assignee: Exara, Inc., San Juan Capistrano, CA (US)

( * ) Notice: Subject to any disclaimer, the term of this patent is extended or adjusted under 35 U.S.C. 154(b) by 352 days.

(21) Appl. No.: 14/580,077

(22) Filed: Dec. 22, 2014

(65) Prior Publication Data

US 2016/0182409 A1 Jun. 23, 2016

(51) Int. Cl.
*H04L 25/20* (2006.01)
*H04L 12/851* (2013.01)
*H04L 12/861* (2013.01)

(52) U.S. Cl.
CPC .............. *H04L 25/20* (2013.01); *H04L 47/24* (2013.01); *H04L 49/9057* (2013.01)

(58) Field of Classification Search
CPC ................ H04L 1/1838; H04L 1/1877; H04L 29/06476; H04L 29/0651; H04L 2001/0097; H04L 25/20; H04L 29/06523; H04L 29/08954; H04L 47/24; H04N 21/2381
See application file for complete search history.

(56) References Cited

U.S. PATENT DOCUMENTS

| 5,802,051 | A | 9/1998 | Petersen |
|---|---|---|---|
| 7,272,605 | B1 | 9/2007 | Hinshaw |
| 8,583,821 | B1 | 11/2013 | Yuan |
| 8,631,154 | B2 | 1/2014 | Bartfai-Walcott |
| 2001/0007570 | A1 | 7/2001 | Mangin |
| 2002/0126675 | A1 | 9/2002 | Yoshimura |
| 2004/0264459 | A1 | 12/2004 | Yun |
| 2006/0074961 | A1 | 4/2006 | Kongalath |
| 2008/0279205 | A1 | 11/2008 | Sgouros |
| 2010/0103932 | A1 | 4/2010 | Kako |
| 2010/0241759 | A1 | 9/2010 | Smith |
| 2010/0322187 | A1 | 12/2010 | Tani |
| 2014/0164611 | A1* | 6/2014 | Molettiere ........... A61B 5/6838 709/224 |
| 2014/0223475 | A1* | 8/2014 | Mcintire ............ H04N 7/17318 725/34 |

OTHER PUBLICATIONS

IBM; Made in IBM Labs: Enabling Dynamic Prioritazion of Data in the Cloud; IBM News Rom; Armonk, N.Y.; Apr. 11, 2014.

* cited by examiner

*Primary Examiner* — Ashley Shivers
(74) *Attorney, Agent, or Firm* — Farjami & Farjami LLP

(57) ABSTRACT

A data stream optimization system is configured to optimize the transfer of data using a plurality of relay nodes acting as the network overlay between a plurality of sources and a plurality of data requesting entities. As each data stream sent from a source to the data requesting entity passes through an relay node, the relay node optimizes network conditions and constraints based upon an identifying "signature" and priority conveyed by the requestor. The system is capable of reprioritizing, rerouting, and modifying the transmission of data streams for the purpose of transfer optimization based upon dynamically changing requestor interest and priority over time.

23 Claims, 1 Drawing Sheet

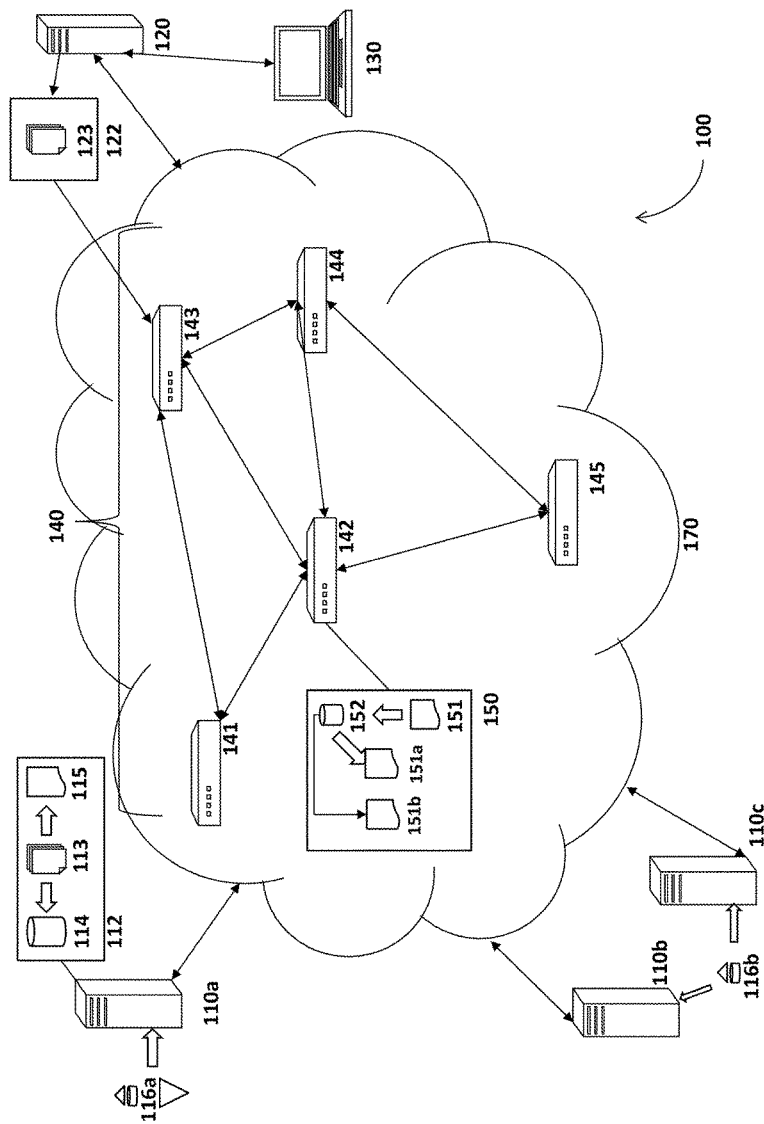

RECIPIENT-DRIVEN TRAFFIC OPTIMIZING OVERLAY SYSTEMS AND METHODS

FIELD OF THE INVENTION

The field of the invention is network traffic management.

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Computer systems are able to accomplish many powerful tasks when they are networked together in a manner to work with one another. The faster data travels between the computer systems, the more seamless the integration between disparate or distant computer systems. The size of data being collected, however, might be so massive that data can't travel from one system to another easily, or so many computer systems might be communicating with one another using the same network that network traffic gridlocks in a way to significantly slow down performance. When so much data is being transferred that computer computations slow down, there is a need to prioritize the data transfer of important computer system tasks over the data transfer of less important computer system tasks.

US2001/0007570 to Mangin teaches a method of sending a plurality of data streams along the same data channel by assigning a priority to certain groups of data, and sending groups of data with the highest priority before sending groups of data with a lower priority. Mangin's system, however, groups each data set as a function of the time when the data was sent. Sometimes, however, set of data that is sent later than an earlier set of data deserves a higher priority because that set of data is more important than the set of data that was sent earlier.

US2002/0126675 to Yoshimura teaches a method of transmitting data packets over a system, where the data packets are separated into data packets used for real-time services and data packets used for non real-time services. The data packets that are labeled as real-time data packets are given a higher transmission priority than the data packets that are labeled as non real-time data packets. Yoshimura, however, only allows a very simplistic analysis of data packets.

US2004/0264459 to Yun divides data packets into high priority and low priority data packets by using a look-up table. The look-up table could classify data packets by data size or target locations, and could then categorize data packets associated with such attributes as high priority data packets or low priority data packets. Further, Yun's look-up table only allows for a one-to-one comparison assigning a specific attribute to a specific priority.

US2008/0279205 to Sgouros teaches a system that could analyze data packets using a complex decision tree having multiple branches and levels. This allows the system to assign priority to data packets by taking multiple attributes into account. Sgouros' system, however, fails to take into account that a user might want to use a different decision tree during one portion of the process than the beginning of the process.

US2010/0103932 to Kako teaches a system that splits a data packet into a plurality of packets, and assigns a different priority to each packet. US2010/0322187 to Tani also teaches a system where data packets are prioritized with predetermined priority values. Both Kako and Tani also fail to take into consideration that one method of prioritization might be appropriate at one time, but a different method of prioritization might be appropriate at another time.

Thus, there remains a need for a system and method that alters the way data within data packets and data transmissions are prioritized during a service process.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods in which a relay node along an electronic data path is provided with the ability to manage (i.e., modify, reroute, and/or reprioritize) data streams transmission based upon feedback derived from a recipient or potential recipient of the data stream. The goal of this process is to bring the most relevant data to recipients as efficiently as possible. Efficiency is evaluated in terms relative to available infrastructure and inclusive of a holistic view of resources that could include CPU, memory, storage capacity, storage throughput and is commonly measured in time and accuracy as perceived by recipients.

The relay node can be programmed to act upon the data stream based on a recognition of an identifier within the data stream that identifies the data stream (or a particular segment of the data stream) for potential management by the relay node. The segments of a data stream referenced by the identifier can therefore be identified and acted upon according to the feedback or commands of a node or application outside of the relay node, such as the recipient node. Identifiers can be included within the payload of a packet of a data stream (or of a particular segment of a data stream).

To incorporate a recipient's feedback to a relevant portion of the data stream, the relay node first receives a recipient signature from the recipient node via the network. The recipient signature can cause the relay node to manage a data stream according to a priority or importance set by the recipient. In preferred embodiments, the recipient signature can be in the form of executable code that can serve to modify or append the default processes and functions of the relay node. In other embodiments, the recipient signature can be in the form of a call to an existing or stored routine or process within the relay node. In still other embodiments, the recipient signature can be made up entirely of non-executable data values.

The relay node can identify the segments of a data stream that the recipient seeks to manage based on the identifier within the data stream and the recipient signature (such as by matching the identifier with information contained by the recipient signature), and manage the data within the data stream corresponding to the identifier according to the recipient signature.

It should also be apparent that the computer-executable processes and functions inventive subject matter can be viewed as a virtual network overlay. The OSI model of computer networking provides for a layer-based hierarchy that is illustrative with respect to the invention. The virtual network overlay that conceptually illustrates the invention would operate at layer 7, application, within context of the OSI model. Regardless of computer networking model, the invention is intended to operate above low level network protocol layers. The invention does not attempt to replicate existing network protocol. Instead, it is a primary goal to convey recipient interest and precise context to relays for processing at the application layer (or layer above an existing network protocol). It is instructive to note that recipient interest is best identified at this level in modern networks, as data transfer in these networks is predominately stateless and sending agents have limited or no facility to receive in-transit feedback from receivers.

As data streams are sent from source to destination, the streams generally travel through interconnecting devices, such as switches and routers that form a network, such as an intranet, a WAN, a LAN, the Internet, or other functionally connected devices that transfer information between computer systems. In a construction that embodies the invention the network comprises one or more relay nodes which have been configured to process data traffic. Contemplated relay node hosts include routers, switches, servers and other computing device form factors capable of supporting modern operating systems or programmable hardware within the network environment of interest.

Various objects, features, aspects and advantages of the inventive subject matter will become more apparent from the following detailed description of preferred embodiments, along with the accompanying drawing FIGURES in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 1 is an overview of an exemplary relay node based virtual network overlay system.

DETAILED DESCRIPTION

The inventive subject matter provides apparatus, systems, and methods in which a network fabric is populated with intermediary nodes configured to optimize data stream traffic to in accordance with one or more recipient signatures.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The term "functionally coupled to" means two elements that may be indirectly coupled to one another in a manner where one element interacts with the other element, such as a computer functionally coupled to another computer using a wireless router or a satellite functionally coupled to an antenna using a line-of-sight connection.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer should be read to include any suitable combination of computing devices, including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

FIG. 1 provides an overview of an example system 100 implementing components, functions and processes of the inventive subject matter. As will be described in further detail below, a relationship exists between source, relay, and endpoint nodes according to the functions and processes of the inventive subject matter. Source nodes provide relays with the ability to identify data streams. Relay nodes provide for data stream inspection and modification. Endpoint nodes convey recipient interest and associated patterns or identifiers in the form of recipient signatures that enable relay nodes to apply functions to appropriate data streams such that the result is aligned with recipient interest or priorities.

Network overlay 170 represents the collection of source nodes, relay nodes, and endpoint nodes according to the inventive subject matter, as described in relation to FIG. 1. Network overlay 170 exists in conjunction with an existing Ethernet network running TCP over IP protocol.

In FIG. 1, source nodes are embodied by computer systems 110*a*, 110*b*, and 110*c* (collectively referenced as source nodes 110). As used herein, a "source" or "source node" is the origination point of a data stream. A source node 110 conveys data stream identifiers and routing details to relay nodes in the network. At a minimum, a source node 110 sends a network-defined initiating address and destination address for a data stream. The specific semantic used will be determined by the network protocol used within the environment the invention is deployed. IP addresses are a common example that would be applicable in an Ethernet network using TCP over IP protocol. The source node 100 can also provide additional identifiers such as MAC identifiers or other identifiers (e.g., unique identifiers created by the source 100, unique identifiers created by a requesting endpoint, an identifier corresponding to a data stream request, etc.) to further distinguish data streams. An identifier can be included within the payload of the packets of the data stream during transmission.

Source computer system 110*a* has non-transitory computer readable memory 112 (e.g., hard drive, solid state drive, optical media, etc.) that holds source data 113. Generally, computer system 110*a* hosts source data 113 that is originated from one or more data sources, such as sensors 116*a*. Thus, data originates in sensors 116*a*, is received by computer 110*a* and persisted to source data 113 by computer 110*a*. Source data 113 may create additional data outputs 114 and 115. It is contemplated that source systems 110*b* and 110*c* receiving data from data sources (such as sensors 116*b*) would also retain source data of similar relevance to this example and be subject to similar processing scenarios. While source data 113 will be the focus of this illustration, multiple concurrent scenarios incorporating elements of the scenario may exist. Other examples of sources of source data 113 can include data storage devices (e.g. databases, either structured or unstructured), user input devices, or other sources of data. It should be appreciated that the data source (such as sensors 116*a*) can be local or remotely located from the source node 110 that it feeds with data (e.g. computer system 110*a*).

As illustrated in FIG. 1, the system 100 can include one or more endpoint nodes 120. As used herein an "endpoint" or "endpoint node" represents a destination for a data stream as defined by the existence of a recipient. A recipient may be a human user, a machine interface or software application and typically signifies the last point of routing between a source 110 and end-point 120 with a non-zero number of intermediate relay nodes 140. In embodiments, an endpoint 120 can be a software application stored and executed on a computing device that facilitates user interaction such as: creation of recipient signatures 123, deserialization of data streams processed by relay nodes 140, conveyance of data streams to other data systems such as a database. In embodiments, the endpoint node 120 can be a computing device specifically programmed to execute its corresponding functions and processes within the framework of the inventive subject matter. At a minimum, an endpoint 120 facilitates creation of recipient signatures 123 and as such may in embodiments be represented by the specification of a semantic structure and rules for programmatically creating a recipient signature 123 compatible with relay nodes 140 in system 100.

As used herein, the term "data stream" refers generally to the transmission of a coherent and contextually definable set of data, independent from but inclusive of network related scheme such as Ethernet packetization. An example of a data stream would be a set of sensor data sent from a jet engine. The set of jet engine data may include many sensor attributes (power, temperature, pressure) as well as values for those attributes at one second intervals for an entire flight and is therefore definable as data from an object with references to object, time and source. By contrast, once transmitted over a network protocol such as Ethernet, this same data stream becomes packetized and within the network is no longer identifiable as "jet engine data." It has effectively lost context for object and source while within the network. Therefore, it should be apparent that a data stream contains context and structure from both the source and the network protocol scheme used to transmit the data from source to end point(s).

Endpoint computer 120 hosts a data consuming application, in this case a database. Users of this database, represented by interface 130, can include consumers of data contained in source data 113 on computer 110. Computer 120 hosts interface 122 which enables recipient signature 123 creation. Recipient signature 123 is transmitted by host interface 122 to relay node 143 (as it is its "entry point" into the network). Relay node 143 conveys recipient signature 123 to other relay nodes, who in turn can convey the signature to other nodes as necessary.

Relay nodes 141-145 represent potential routing and/or inspection points between a data stream originating from source data 113 on source node 110 being conveyed to a data consumer 130, connected to endpoint computer 120.

The term "relay node" or "relay" is used throughout to reference a computing device programmed to execute software instructions to facilitate and execute the packaging, transmission, routing and delivery of data in a computer network system according to functions and processes of the inventive subject matter. A relay node 141-145 (generally referred to individually or collectively relay node(s) 140) can process data streams coming from a plurality of sources 110. Examples of relay processing can include deserialization, inspection, and prioritization. A relay node 140 can be a software-based application installed on a computer operating system such as Linux or embedded as firmware on a hardware based device such as FPGA. It is instructional to note that a router, a network layer hardware device or software application that routes data packets through a network, could be augmented with the processes and functions of the inventive subject matter and used as a relay node 140. It should further be noted that not all intermediaries, or network points of relay, between sources 110 and end-point 120 need to be augmented by the systems and functions of present invention. In other words, it is contemplated that conventional routers, network layer hardware devices, routing software applications and other routing computing devices may exist in the network in between relay nodes 140 or between a source 110 and relay node 140 or an endpoint 120 and relay node 140.

It should further be appreciated that the relay nodes 140 can retain the ability to perform conventional routing functions within a network, such as when the functions and processes of the inventive subject matter are not being invoked and/or executed by the relay nodes 140, when routing data between network components not equipped to employ the functions and processes of the inventive subject matter, etc.

As used herein a "recipient signature" describes a data construct or instruction by which a recipient may define a semantic structure and pattern of interest and compose that pattern into a form that is programmatically useful to the relay 140. A recipient signature 123 can be created by the recipient (e.g., a data user who could be a developer, system user, or software application). A recipient signature 123 is created within the frame of reference of an endpoint, typically at an endpoint node 120.

A conceptual example of the function of the recipient signature 123 is demonstrated by two individuals discussing the color of an object. The first individual claims the object is blue and will "relay" this observation to several friends. However, the second individual claims the object is green and will relay this to many friends, some of which are shared with the first individual. There is no arbitration possible as only the two individuals see the object. Who will define what a color "looks" like in this scenario? Given this context, a "recipient signature" will act as an arbitrator, definitively stating the attributes of "blue" and "green" such that both are uniquely distinguishable.

A recipient signature 123 can come in various forms used to affect how relay node 140 manages a data stream. In embodiments, a recipient signature 123 can comprise executable code that can change or modify the processing of the data stream by the relay node 140 without requiring changes or modifications to the data content within the data stream itself.

In these embodiments, a recipient signature 123 uses a semantic structure that is supported by relay nodes 140. One example semantic would be a Python computer language regular expression. A recipient signature 123 can convey data user interest to data extractors 150 through software code. Extending the example provided above, a relay node 140 receives a recipient signature 123 function with the purpose of detecting "color". A capability for color detection can now be applied to a data stream through a data extractor 150 at a relay node 142 that conveys meaning for the color "blue" that is consistent with the endpoint data user's current interpretation of the color "blue". A recipient signature 123 may be stored on a relay 140 and applied by time based or algorithmic trigger. A recipient signature 123 may be supplied to a relay 140 and applied to data streams already in transit, or against those to be transmitted at some future time.

In FIG. 1, functions and processes of the inventive subject matter are illustrated in greater detail with regard to relay node 142. It should be appreciated that the functions and processes associated with relay node 142 are similarly applicable to other relay nodes (such as nodes 141 and 143-145) employing the inventive subject matter in a network overlay 170 such as the one illustrated in system 100.

A relay node 142 can include a data extractor 150. Generally speaking, a data extractor 150 can comprise computer-executable instructions stored on the relay node 142 that cause the relay node 142 to apply a recipient signature 123 to a data stream. Thus, a data extractor 150 can be embodied as software code or a software module with, at minimum, the ability to incorporate and apply a recipient signature 123 function to a data stream 151 with the common purposes of inspection, evaluation, and logic execution such as rule or cost based optimization, hierarchical prioritization, or similar algorithmically composed decision trees. While not comprehensive, the functional "roles" provided below illustrate the responsibilities, functions and capabilities of the data extractor 150:

1. A parsing relay function establishes an input framework for recipient signatures and the functional capability to translate the input into programmatic commands executed by the relay node 142. The framework is typically defined with a semantic structure and language, such as an XML input file with commands based on a procedural programming language. The parsing feature translates the recipient signature 123 input into programmatically executable methods compatible with the relay's functions.

2. A prioritizing relay function associates system state, such as network performance details, available computing resources, data stream rate and volume, etc., with the result of matches between data streams and recipient signatures 123. Typically, a rule or cost based decision algorithm is used with these inputs and as a result generates new priorities for some portion of a matching data stream. Once identified, priority may then instigate further processing actions by the relay 142 for the data stream(s) in question.

3. An aggregate relay function collects data streams identified by a recipient signature 123 and applies algorithms that can improve delivery rate, latency, or reduce volume as a result of correlation or duplication across more than one data stream. An example is the application of compression algorithms that benefit from pattern identification or duplication within data stream elements.

4. A dispatch relay function provides for relay-to-relay routing at a layer above the base network protocol. A dispatch function can enable multiple relay nodes 140 to be co-opted into a functional processing plan for one or more data streams. The dispatch function also enables relay-to-relay message sharing. Examples of this may include propagation of system information including recipient signature sharing, relay location and network topology details, and system level metadata in support of redundancy and failover features.

5. A cache relay function enables volatile or non-volatile storage of portions of a data stream. This enables the invention to remove data from a data stream for delayed dispensation, or for further immediate processing prior to re-introducing the data the network from which it was removed.

Relay node 142 combines recipient signature 123 with data extractor 150 based on priority and compatibility instructions provided within the recipient signature 123. This combination of functions enables relay node 142 to alter data stream 151.

More specifically, recipient signature 123 contains a regular expression, expressed in a Java function that identifies a string of high priority (i.e., a string of high interest) within a class of data streams commonly requested by recipients. Data extractor 150, a prioritizer also written in Java code, incorporates recipient signature 123 thus enabling identification of high priority content for in-transit data streams. Identification of data streams of interest is facilitated by functions and rules programmed into the data extractor 150 and data stream identifiers provided by source node 110*a*.

In one example, recipient signature 123 can contain a hash function written in Java code that generates a hash value representation of a string of interest ("recipient hash value") provided by the recipient at endpoint 120. In this example, the recipient signature 123 can also include the hash value representation of the string of interest itself. Thus, to identify the data content of interest, the data extractor 150 executes the hash function on some or all of the data stream 151 as it arrives at the relay 142 to generate a stream hash value. The data extractor 150 compares the stream hash with the hash value representation of the string of interest itself to determine whether a match exists. When the stream hash matches the hash value representation of the string of interest (either exactly or within a pre-determined acceptable degree of similarity), the data extractor 150 singles out that particular segment of the data stream as containing the "high priority" content desired by the recipient.

More than one reference hash value representation (corresponding to more than one string of interest) can be included in a recipient signature 123, such as where multiple levels of priority can exist.

It should be noted that the hash function can be executed on some of or all of the incoming data stream. Thus, the hash function can be applied to a particular segment of a data stream; a particular section of a packet, a particular section of a packet payload, according to a periodicity of the data stream, according to a pattern of packets (i.e., some are hashed, some are not, based on a pre-determined pattern), or other pre-defined logic.

Continuing with this example, if the recipient wished to change the priority, reflecting an interest to receive different content faster, the endpoint 120 can provide a replacement or new recipient signature 123 that can include a new hash function (to generate a new hash value representation) and a new hash value representation to use as a reference. This can correspond to a new string of interest. In a variation of this example, the new recipient signature 123 can simply include a new hash value representation to use a reference that reflects the use of the same hash function on a new string of interest. This allows for the data extractor 150 to recognize a shift in priority within the same data stream (or even same section of a data stream) while employing the single hash function.

In other embodiments, the recipient signature 123 can comprise a call to a routine previously stored within the relay 142. The stored routine can be a previously-used recipient signature 123 for the particular endpoint, one of a plurality of pre-defined applicable priority management routines, etc.

In still other embodiments, the recipient signature 123 can comprise a recipient identifier (such as a string of interest itself) that is matched against the data stream (or a section thereof) to identify the high-priority data contents within the data stream. In these embodiments, the data extractor 150 is a priori programmed to perform the comparison between the received recipient identifier and the data stream (or section thereof). In one aspect of these embodiments, the data extractor 150 can be programmed to assume that a match means the corresponding segment of data is of high priority. In other aspects of these embodiments, the data extractor 150 can be programmed to modify the priority according to a plurality of degrees among a scale and, as such, the recipient signature 123 can further include a designation of priority for matches within this scale.

In embodiments, the data stream identifier that identifies relevant data streams can be separate from the string of interest or section of the data stream hashed for comparison with the hashed value representation of the stream of interest. Thus, in these embodiments, the data extractor 150 can separate potential data streams containing content of interest from other, less relevant data streams coming through the relay node 142. In other embodiments, the string of interest or the hash value representation data stream identifier can also be the data stream identifier, such that the high-priority data content is identified and pulled from all of the available data streams at one time.

Data extractor 150 subsequently removes and locally caches in storage on relay node 142 non-matching lower priority content from the data stream 151. The resulting data stream 151b (corresponding to the non-matching lower priority content), a reduction and therefore subset of data stream 151, is temporarily stored on relay node 142 in cache 152. This reduces the volume of data being transmitted on a portion of the route between the source system 110a and endpoint 120 which includes relay nodes 143 and 144 after initially passing through relay 142. Data is retained in cache 152 for a time period algorithmically deduced by relay node software as necessary to reduce network volume based upon prior empirical model encapsulated in a rule based decision engine within the data extractor 150, for example a period of ten minutes. The remaining, high priority, elements of data stream 151a have continued to flow through the network—representing the portion of data stream 151 that was not identified for local caching. After ten minutes has elapsed, data stream 151b is reintroduced to the network and is routed to endpoint 120 at the discretion of the network protocol. It is not implied, or necessary that data stream 151b would take the same network or relay route to computer 120 as data stream 151a.

It should be noted that the separation of the content data of data stream 151b from data stream 151a can include a separation down to the packet level. For example, a packet within the data stream 151 could, due to the packetization processes employed at the source 110a, include content data that ultimately corresponds to data stream 151a and data stream 151b and, as such, could be split along intra-packet lines and re-packetized according to the updated priorities of the separate content streams 151a, 151b.

In another illustrative example, a data stream 151 is made up of JSON objects having multiple properties. The recipient signature 123 function can instruct the data extractor 150 to search for a value of one of the properties of the object and return the range of the value (e.g., for a value between [0,10], return a signature block of "1"; for a value between [11,100], return a signature block of "2"; [101, 1000], return a signature block of "3", [1001,10000], return signature block of "4", and so on). The relay node decision logic can be set with priority rules (included in the recipient signature 123) such that a priority is assigned to data proportionally with the portions of the data stream identified by the data extractor 150 (according to a specified priority or priority level for each signature block value, thresholds of signature block values, ranges of signature block values, etc). Subsequently, (for example, as the requesting system receives further data streams) the relay node 140 can apply modifications (via updates or replacements to the recipient signature 123) based on threshold logic in the data extractor 150 such that if the currently applied recipient signature output is larger than "2", assign a "low" priority ("low" being one of two or more possibly priority levels; others can include "medium" or "high"). The rationale being that requesting endpoint 120 has seen "enough" objects with a property value larger than 1000 for its purposes, and wishes to receive lower-range values.

In another illustrative example, a data stream 151 can be in the form of a time series made up of pairs {timestamp, value} attributes. A relay node 140 within the network receives a data stream 151 that is to be passed on to recipient 120. The recipient 120 of the data stream 151 has provided a recipient signature 123 to relay node 140 to manage the data stream. In this example, the signature 123 comprises 1) executable code programmed to identify data of interest (via a matching process to identify matches in data stream 151) and 2) provides an executable process composed of multiple procedures implemented in the C programming language. These procedures can include a procedure to split and project a buffer of time series data (the pairs attributes) into designated time intervals (e.g., one minute intervals of values) having a corresponding time interval size (in this example, a corresponding minute of value size for each discrete minute of value), an entropic compressor, a designated frequency distribution, and priority instructions. Thus, when executed by the relay node 140, the signature 123 first identifies that data stream 151 is of interest (e.g. based on a match of a reference value in a signature against data values in the data stream 151). Next, the signature 123 splits and projects the time series data into one minute intervals and subsequently passes them to the entropic compressor. The entropic compressor utilizes a frequency distribution of values received from the recipient 120 to compress the data (i.e. the one minute intervals of data) and then the priority instructions are used to calculate a priority that is added to each one minute interval. The frequency distribution from the recipient can be provided as part of the signature 123 or via a separate communication. The result of the compression can be bit streams of compressed one-minute intervals, each bit stream having a bit stream size. In this example, the priority instructions can include an active rule for the relay node 140 that demands network prioritization for any signature 123 processed data targeting recipient 120. This results in the relay process creating data stream 151a which contains high priority data, and data stream 151b which contains low priority data. In another example, priority instructions can cause the relay node 140 to prioritize the time series minutes (in a compressed bit stream form) according to a compression level under the designated frequency distribution received from the recipient 120. For example, the priority instructions can cause the relay node 140 to send with a higher priority the time series minutes that compress the least under the designated frequency distribution. Thus, the signature 123 can cause the node 140 to calculate a compression ratio between the bit stream size of each bit stream and the minute of value size of the minute of value associated with the particular bit stream. The generated compression ratio can be attached to or otherwise linked with the corresponding minute of value. In one variation of this example, the recipient signature 123 can include priority instructions that cause the relay node 140 to group each minute of value into a high-priority group or a low-priority group according to its associated compression ratio. To determine whether a compression ratio of a minute of value corresponds to a high-priority group or a low-priority group, the relay node 140 compares the compression ratio of the minute of value to a mean compression ratio of all of the minutes of value in the buffer. Thus, a high-priority group can be those minutes of value having compression ratios that are larger than the calculated mean compression ratio and the low-priority group can be those minutes of value having compression ratios lower or equal to the mean compression ratio. In another variation of this example, the relay node 140 can receive a set of high-priority compression ratios (e.g., individual compression ratios or ranges/intervals of ratios) from the recipient 120 (as either part of the recipient signature 123 or as a separate communication). In this variation, the signature 123 programs the relay node 140 to group each of the minutes of value into a high-priority group or a low priority group based on their respective compression ratios falling within one of the designated high-priority ratio intervals (or in the case of individual designated high-priority ratio values, the compression ratio matching these designated high-priority ratio values) from the set of high-priority interval ratios. It is further contemplated that the set of high-priority ratio intervals can have different levels of priority for one or more of the high-priority ratio intervals in the set. Thus, the priorities associated with the high-priority ratio intervals can have additional levels beyond merely "high" and "low", and can be ranked. As such, the recipient 120 can set gradients of priority for the data it wishes to receive.

The rationale to utilize the compression levels as described in these examples can be that the recipient 120 can infer that more information is actually contained in those lesser compressed intervals of the time series, or that having computed the frequency distributions out of already received time series the recipient 120 wants to prioritize traffic that differs from what it already received. Because the entropic compression needs the frequency distribution to execute and the compression level depends on the frequency distribution, the recipient is able to manipulate and change the priorities for the relay node 140 via the provision of designated frequency distributions. Over time the recipient 120 may update in part or in whole, via subsequent recipient signatures 123 (either updates to the prior signature or replacements for it), the frequency distribution and/or change the order of the entropic compressor or request the highest compressed chunks, in order to tailor the relays 140 to its most pressing needs at that particular moment.

Since networked data processing systems frequently have disparate computer devices (e.g. a Microsoft Windows system, a Red Hat system, and an Ubuntu system) and collect sensor data from a variety of disparate environments, software code for the relay nodes 140 is preferably written in a universally acceptable format, or in a format that could be interpreted on multiple operating systems. To support such code, the nodes 140 preferably have some sort of regular expression engine or an ability to run specialized, bespoke code. For example, a node 140 could have a language interpreter (e.g. Lisp, Python), virtual machine intermediate code (e.g. Java), just in time compiled code/dynamic translation (e.g. Smalltalk, LLVM), etc.

The various data extractor functions of the inventive subject matter can incorporate one, or a combination of, rules-based decision engines, functional state engines, and cost-based optimization engines. Such rules, functions, and cost thresholds could be defined by a user, or could be "learned" by the system by performing historical analysis identifying common attributes of low performance-time systems. For example, the optimization functions can trigger an algorithmic "tie-breaker" between competing high-priority subsets when the system detects a saturated network (e.g. at least one node having a waiting list of data subsets above a specified threshold) or when the system detects a high number of high-priority subsets (e.g. at least one node having above a specified threshold number of subsets of the highest priority).

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A relay node computing device for relaying a data stream from a source node to a recipient node through a network, the data stream including data objects each having at least one property and a corresponding property value, the relay node computing device comprising:
a memory storing a program; and
a processor configured to execute the program to:
identify an identifier within the data stream;
receive a recipient signature from the recipient node through the network;
manage at least one first segment of the data stream as a function of both the identifier and the recipient signature, wherein the at least one first segment of the data stream is associated with the identifier;
match, for a first data object of the data objects, the first property value of the first data object to a property value range among a plurality of property value ranges;
return a signature block value associated with the matched property value range; and
assign a priority to the first data object based on the signature block value.

2. The relay node computing device of claim 1, wherein managing comprises altering a priority of the first segment relative to a second segment of the data stream.

3. The relay node computing device of claim 2, wherein altering the priority of the first segment relative to the second segment comprises raising the priority of the first segment relative to the second segment, and wherein the processor is further configured to execute the program to:
separate the first segment of the data stream from the second segment of the data stream;
transmit the first segment of the data stream toward the recipient node; and
delay the transmission of the second segment of the data stream as a function of current network conditions.

4. The relay node computing device of claim 1, wherein the processor is further configured to execute the program to identify the identifier within a payload of a packet of the data stream.

5. The relay node computing device of claim 1, wherein the processor is further configured to execute the program to identify the identifier within a payload of a packet of the first segment of the data stream.

6. The relay node computing device of claim 1, wherein the recipient signature comprises an executable code.

7. The relay node computing device of claim 6, wherein the executable code is executed by the processor of the relay node computing device to:
apply a hash function to at least a portion of the data stream to generate a stream hash value; and
identify the identifier within the data stream by determining that the generated stream hash value matches a recipient hash value, wherein the matching generated stream hash value comprises the identifier.

8. The relay node computing device of claim 7, wherein: the recipient signature further includes the recipient hash value; and the recipient hash value comprises a hash value representation of a recipient-designated string of high-priority generated using the hash function.

9. The relay node computing device of claim 1, wherein the recipient signature comprises a recipient identifier value.

10. The relay node computing device of claim 9, wherein the function comprises comparing at least a portion of the identifier to at least a portion of the recipient signature.

11. A relay node computing device for relaying a data stream from a source node to a recipient node through a network, the data stream including a time series comprising a plurality of pairs {timestamp, value} attributes, the relay node computing device comprising:
a memory storing a program; and
a processor configured to execute the program to:
identify an identifier within the data stream;
receive a recipient signature from the recipient node through the network;
manage at least one first segment of the data stream as a function of both the identifier and the recipient signature, wherein the at least one first segment of the data stream is associated with the identifier; and
receive a frequency distribution of values from the recipient;
wherein the recipient signature programs the processor of the relay node computing device to:
split and project a buffer of the time series pairs attributes into a plurality of minutes of values, each minute of value having a corresponding minute of value size;
apply, to each of the plurality of minutes of values and with the received frequency distribution of values, entropic compression to produce corresponding bit streams having a bit stream size;
calculate a compression ratio between the bit stream size of each bit stream and the minute of value size of the minute of value associated with the bit stream; and
attach the calculated compression ratio to the corresponding minute of value.

12. The relay node computing device of claim 11, wherein the recipient signature further programs the processor of the relay node computing device to:
group each minute of value into a high-priority group or a low-priority group according to its attached compression ratio, wherein the grouping a minute of value into a high-priority group corresponds to its attached compression ratio being larger than the mean compression ratio for all of the minutes of value of the buffer.

13. The relay node computing device of claim 11, wherein the processor of the relay node computing device is further programmed to:
receive a set of high-priority interval ratios from the recipient, and wherein the recipient signature further programs the processor of the relay node computing device to:
group for transmission each minute of value into a high-priority group or a low-priority group according to their associated compression ratios falling within a high-priority interval ratio from the set of high-priority interval ratios.

14. A method for execution by a processor of a relay node computing device for relaying a data stream from a source node to a recipient node through a network, the data stream including data objects each having at least one property and a corresponding property value, the method comprising:
- identifying an identifier within the data stream;
- receiving a recipient signature from the recipient node through the network;
- managing at least one first segment of the data stream as a function of both the identifier and the recipient signature, wherein the at least one first segment of the data stream is associated with the identifier;
- matching, for a first data object of the data objects, the first property value of the first data object to a property value range among a plurality of property value ranges;
- returning a signature block value associated with the matched property value range; and
- assigning a priority to the first data object based on the signature block value.

15. The method of claim 14, wherein managing comprises altering a priority of the first segment relative to a second segment of the data stream.

16. The method of claim 15, wherein altering the priority of the first segment relative to the second segment comprises raising the priority of the first segment relative to the second segment, and wherein the method further comprises:
- separating the first segment of the data stream from the second segment of the data stream;
- transmitting the first segment of the data stream toward the recipient node; and
- delaying the transmission of the second segment of the data stream as a function of current network conditions.

17. The method of claim 14 further comprises identifying the identifier within a payload of a packet of the data stream.

18. The method of claim 14 further comprises identifying the identifier within a payload of a packet of the first segment of the data stream.

19. The method of claim 14, wherein the recipient signature comprises an executable code.

20. The method of claim 19 further comprises executing the executable code to:
- apply a hash function to at least a portion of the data stream to generate a stream hash value; and
- identify the identifier within the data stream by determining that the generated stream hash value matches a recipient hash value, wherein the matching generated stream hash value comprises the identifier.

21. The method of claim 20, wherein: the recipient signature further includes the recipient hash value; and the recipient hash value comprises a hash value representation of a recipient-designated string of high-priority generated using the hash function.

22. The method of claim 14, wherein the recipient signature comprises a recipient identifier value.

23. The method of claim 22, wherein the function comprises comparing at least a portion of the identifier to at least a portion of the recipient signature.

* * * * *